(12) United States Patent
Vigna et al.

(10) Patent No.: US 11,977,055 B2
(45) Date of Patent: May 7, 2024

(54) GUIDE FOR COMPRESSION TEST HAVING SUPPORT MEMBERS MOVEABLE IN A LOADING DIRECTION

(71) Applicant: Illinois Tool Works Inc., Glenview, IL (US)

(72) Inventors: Lorenzo Vigna, San Benigno Canavese (IT); Davide Paolino, Turin (IT); Giovanni Belingardi, Turin (IT)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/393,048

(22) Filed: Aug. 3, 2021

(65) Prior Publication Data

US 2022/0057307 A1 Feb. 24, 2022

(30) Foreign Application Priority Data

Aug. 19, 2020 (EP) .................................... 20191721
Jul. 27, 2021 (EP) .................................... 21188048

(51) Int. Cl.
*G01N 3/08* (2006.01)
*G01N 3/02* (2006.01)
*G01N 3/04* (2006.01)

(52) U.S. Cl.
CPC ................. *G01N 3/02* (2013.01); *G01N 3/08* (2013.01); *G01N 2203/0019* (2013.01); *G01N 2203/04* (2013.01)

(58) Field of Classification Search
CPC .. G01N 3/02; G01N 3/08; G01N 3/04; G01N 3/24; G01N 3/30; G01N 3/20; G01N 3/10;

(Continued)

(56) References Cited

U.S. PATENT DOCUMENTS

| 5,811,686 A | 9/1998 | Lavoie |
| 2018/0252625 A1* | 9/2018 | Schaefer .................. G01N 3/08 |

FOREIGN PATENT DOCUMENTS

| EP | 2813836 | 12/2014 | |
| EP | 3957973 A1 * | 2/2022 | ............... G01N 3/02 |

OTHER PUBLICATIONS

European Office Communication with Extended Search Report Appln No. 21188048.9 dated Jan. 4, 2022.

(Continued)

*Primary Examiner* — Brandi N Hopkins (74) *Attorney, Agent, or Firm* — McAndrews, Held & Malloy, Ltd.

(57) ABSTRACT

The present disclosure provides for a guide for use in a compression test, the compression test comprising loading a test sample between a first loading plate and an opposing load applied between the test sample and the first loading plate in a loading direction, the guide comprising: at least one support member, positionable between the first loading plate and the load and extending substantially parallel to the loading direction to constrain the test sample in a direction perpendicular to the loading direction, wherein, when in use, the at least one support member is positioned to define a space between the first loading plate and the support member such that when a load is applied the test sample is deformable in a direction perpendicular to the loading direction within the space.

9 Claims, 10 Drawing Sheets

(58) Field of Classification Search
CPC ........ G01N 19/02; G01N 1/28; G01N 17/002;
G01N 33/5304; G01N 35/10; G01N
3/303; G01N 33/54366; G01N 3/42;
G01N 23/046; G01N 1/00; G01N 3/34;
G01N 19/04; G01N 2203/0254; G01N
3/16; G01N 2203/0019; G01N 2203/04;
G01L 1/04; G01L 5/28; G01L 1/06;
G01B 21/00
See application file for complete search history.

(56) References Cited

OTHER PUBLICATIONS

Pablo Feraboli: "Development of a modified flat-plate test specimen and fixture for composite materials crush energy", Jul. 20, 2009 (Jul. 20, 2009), pp. 1967-1990, XP055153401, DOI: 10.1177/0021998309343025 Retrieved from the Internet: URL:https://journals.sagepub.com/doi/10.1177/0021998309343025 [retrieved on Nov. 17, 2014].

Vigna Lorenzo et al: "An innovative fixture for testing the crashworthiness of composite materials", Frattura Ed Integrita Strutturale, vol. 15, No. 55, Dec. 28, 2020 (Dec. 28, 2020), pp. 76-87, XP055873841, DOI: 10.3221/IGF-ESIS.55.06 * paragraph: fixture; p. 79-p. 80.

* cited by examiner

GUIDE FOR COMPRESSION TEST HAVING SUPPORT MEMBERS MOVEABLE IN A LOADING DIRECTION

RELATED APPLICATIONS

The present application claims the benefit of European Patent Application No. 21188048.9, filed Jul. 27, 2021, and of European Patent Application No. 20191721.8, filed Aug. 19, 2020. The entireties of European Patent Application Nos. 21188048.9 and 20191721.8 are incorporated herein by reference.

TECHNICAL FIELD

The disclosure relates to a guide. In particular, the disclosure relates to a guide for a compression test, more specifically a drop tower compression test.

BACKGROUND

Edgewise compression test samples are prone to buckling, and so test fixtures commonly have guides to inhibit buckling. However, in order to provide a stroke length for the compression test, an unsupported length of the test sample must be provided. Clearly, the unsupported length is prone to buckling and so the length thereof is limited by the geometry of the test sample, thereby limiting the size of test sample available.

In order to overcome this problem, it is known to use support bars extending over the entire length of the test sample, such that the support bars are received within holes in a loading plate, and the loading plate slides along the support bars. However, the support bars may inhibit gross deformation of the test sample.

It is an object of the present disclosure to overcome these limitations.

BRIEF SUMMARY

According to the present disclosure there is provided a guide for use in a compression test, the compression test comprising loading a test sample between a first loading plate and an opposing load applied between the test sample and the first loading plate in a loading direction, the guide comprising: at least one support member positionable between the first loading plate and the load and extending substantially parallel to the loading direction to constrain the test sample in a direction perpendicular to the loading direction, wherein, when in use, the at least one support member is positioned to define a space between the first loading plate and the support member such that when a load is applied the test sample is deformable in a direction perpendicular to the loading direction within the space.

The test sample may be a fibre reinforce polymer (FRP) test sample. The test sample may be a carbon fibre reinforced polymer (CFRP) test sample. The test sample may be a glass fibre reinforced polymer (GFRP) test sample. The test sample may also be made from a material that includes any one of plastics or such polymers, metals and woods.

The load applied to the test sample may be provided by an impactor member.

The first loading plate may be a lower loading plate relative to the impactor member, during use.

The impactor member may comprise a substantially planar-shaped impactor head portion having a contact surface configured to engage with the test sample. For example, the impactor head portion may be substantially disc-shaped, but any other planar shape is envisaged. Preferably, the substantially spherically shaped contact surface may have a predetermined radius adapted to provide an optimised gradual distribution of the load energy into the test sample, during use.

At least one support member may be disposed on each side of the test sample. For example, for a planar test sample, at least one support member may be provided on each of the major sides of the test sample.

The guide may further comprise a support plate on each side of the test sample, wherein each support plate may have at least one support member operably connected thereto.

Each support member may be selectively moveably connected to the respective support plate, so as to allow sliding movement in the loading direction of any of the at least one support member relative to respective one of the support plate. Accordingly, the support member(s) can be moved to adjust a size of the space.

The support plate on one side of the test sample may be configured to cooperatingly engage with the support plate on the other side of the test sample so as to provide a predetermined clamping force on the test sample.

Each one of the at least one support member may comprise a Polytetrafluoroethylene (PTFE) coating adapted to minimize friction between the test sample and each one of the at least one support member, during use.

Each support plate may have at least two support members connected thereto.

The support plate may be moveable in a direction perpendicular to the loading direction. This may be to accommodate various thicknesses of test sample.

The guide may be disposed upon a table. The table may be disposed upon a pillar. The pillar may comprise handles for manoeuvring the table and the guide into a test configuration.

The at least one support plate may comprise a passage along an edge corresponding to the space between the first loading plate and the support member. The passage may be greater than the width of the test sample. The at least one support plate may rest upon the first loading plate on either side of the passage. The at least one support plate may be supported by brackets along each edge which is parallel to the loading direction. The brackets may rest upon the table. The brackets may be connected to an adjustment device, for adjusting the respective support plate and support members connected thereto, in the direction perpendicular to the loading direction.

The distance between the at least one support plate and a second loading plate may define the stroke length of the compression test.

The guide may be used in a dynamic compression test. The guide may be used in a drop tower compression test. An impactor of a drop tower test machine may impact, in use, a second (upper) plate.

The guide may be used in a quasi-static compression test. The guide may be used in a compression test.

The guide may be used in a cyclic loading test (e.g. a fatigue test).

BRIEF DESCRIPTION OF SEVERAL VIEWS OF THE DRAWINGS

Example embodiment(s) of the disclosure are illustrated in the accompanying drawings, in which:

FIG. 7 illustrates the guide of FIG. 6, (a) in front view and with a shorter central support member provided between the four corner support members and extended upwards, and (b) in a perspective side view with the central support member retracted into the support plate;

FIG. 8 illustrates the guide of FIG. 6 in (a) a front view, (b) a side view and (c) a perspective view, with an impactor moving down towards the test sample; and FIG. 9 illustrates the head portion of the impactor (a) with a flat contact surface and (b) with a spherical contact surface.

DETAILED DESCRIPTION

Certain terminology is used in the following description for convenience only and is not limiting. The words 'right', 'left', 'lower', 'upper', 'front', 'rear', 'upward', 'down' and 'downward' designate directions in the drawings to which reference is made and are with respect to the described component when assembled and mounted. The words 'inner', 'inwardly' and 'outer', 'outwardly' refer to directions toward and away from, respectively, a designated centreline or a geometric centre of an element being described (e.g. central axis), the particular meaning being readily apparent from the context of the description.

Further, as used herein, the terms 'connected', 'attached', 'coupled', 'mounted' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, "first", "second", "third" etc. merely indicate that different instances of like objects are being referred to and are not intended to imply that the objects so described must be in a given sequence, either temporally, spatially, in ranking or in any other manner.

Like reference numerals are used to depict like features throughout.

The illustrated embodiments relate to a guide for a compression test. The guide includes support members and a gap at the bottom to allow the test sample to deform in a direction perpendicular to the loading direction.

The guide may be used in dynamic edgewise compression testing, for example in a drop tower edgewise compression test. The embodiment illustrated in FIGS. 1-4 is for use in a drop tower, and the test sample in FIG. 5 has been tested using a drop tower. However, the skilled person will appreciate that the guide can be used in other compression tests, such as high speed dynamic, quasi-static, creep and cyclic compression tests. Furthermore, the test sample illustrated in the embodiment shown in FIGS. 1-4 are carbon fibre reinforced polymer (CFRP) test samples, and the test sample illustrated in FIG. 5 are glass fibre specimen. However, the skilled person will appreciate that other test samples can be tested using the guide.

Figure 1:
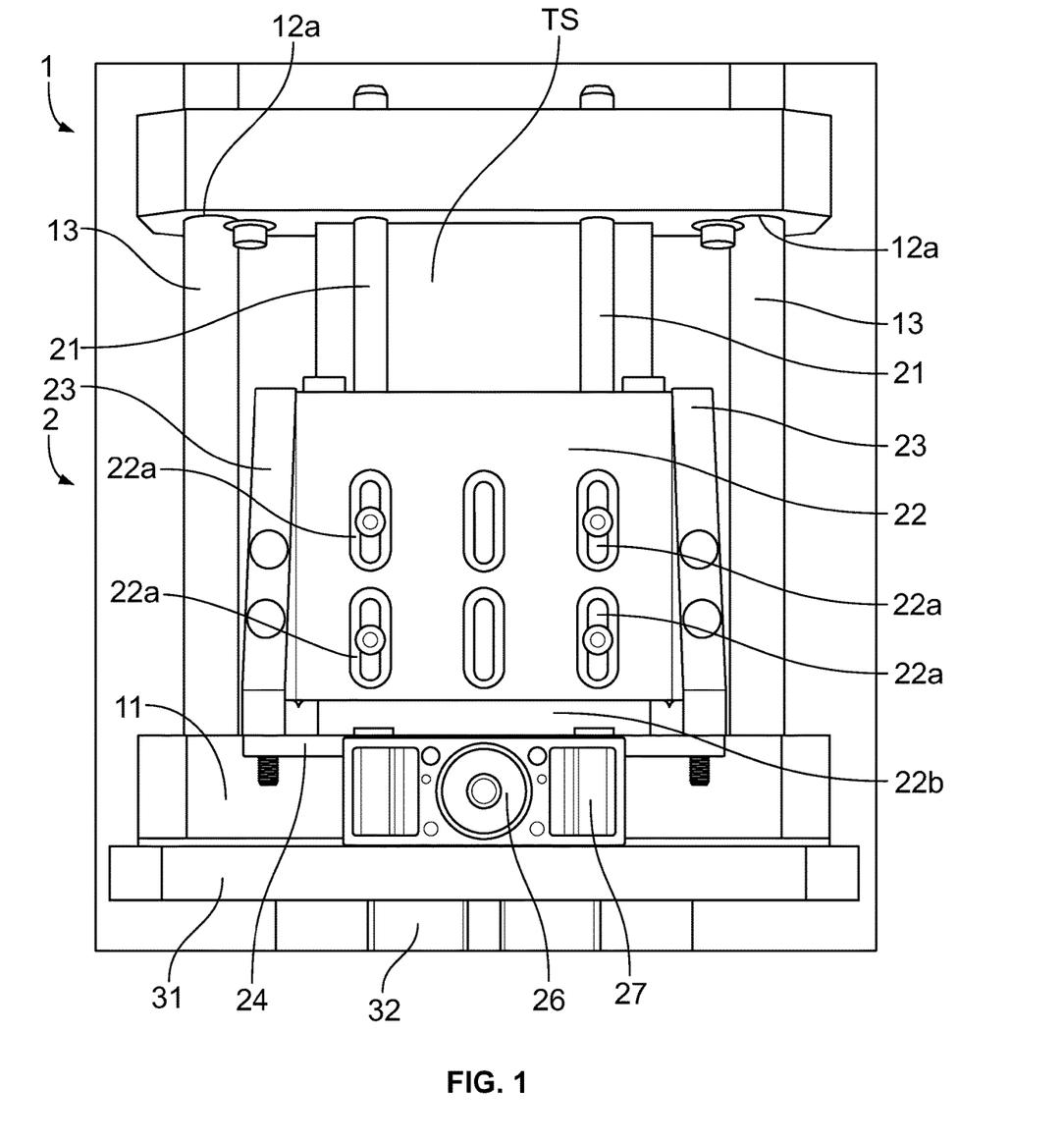
FIG. 1 illustrates a guide according to the disclosure.

Referring now to FIG. 1, a test fixture 1 for use in a drop tower, for edgewise compression testing a flat, planar test sample TS, is illustrated. In this embodiment the test sample TS is 150 mm tall and 100 mm wide, but it will be appreciated that any size of test sample can be used, and the test sample TS is not limited to a flat, planar test sample TS as illustrated.

The test fixture 1 comprises a first or bottom loading plate or platen 11 and a second or top loading plate or platen 12. A test sample TS is located in an edgewise configuration, between the first and second loading plates 11, 12. In use, the second loading plate 12 moves towards the first loading plate 11 to apply a compressive load to the test sample. Movement of the second loading plate 12 is via an impactor of a drop tower machine impacting the top of the second loading plate 12. It is understood by the skilled person in the art that movement and force may be provided by any other suitable test machine, e.g. a quasi-static or high-speed compression machine.

Alignment of the second loading plate 12 is maintained by four guide bars 13. Each guide bar 13 is received in a respective through-hole 12a in the second plate 12.

Figure 2:
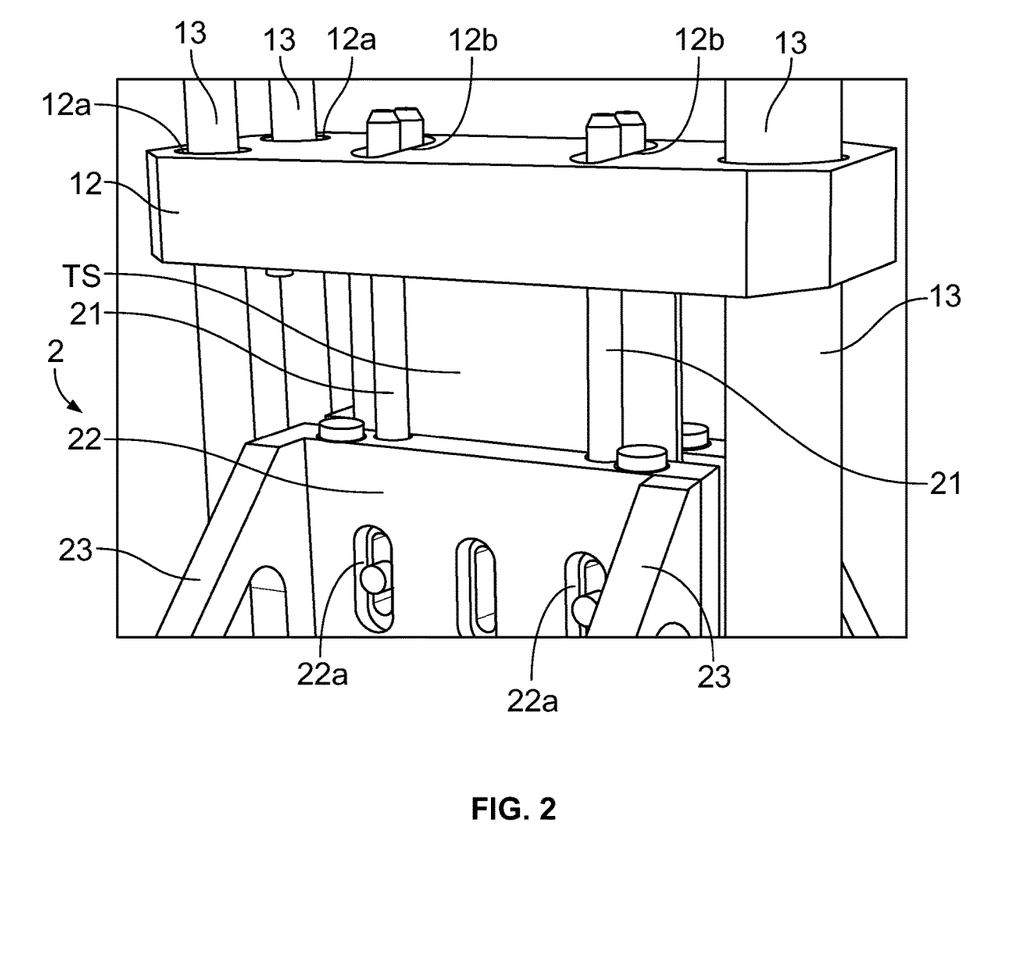
FIG. 2 illustrates support members of the guide according to FIG. 1.

Referring now to FIG. 2, a guide 2 is positioned between the first and second loading plates 11, 12 to inhibit global buckling of the test sample TS during compression testing. The guide 2 comprises four support members 21. In this embodiment, the support members 21 are circular rods, but other configurations are envisaged, such as knife edges. Two support members 21 are located on either side of the test sample TS, orientated to be parallel with the loading direction. The horizontal proximity of the support members 21 to the surface of the test sample TS is dependent upon the test configuration. The support members 21 may be spaced from or in contact with the test sample TS.

The support members 21 are received in slots 12b in the second loading plate 12. The slots 12b provide clearance around the support members 21, such that the support members 21 do not inhibit movement of the second loading plate 12.

Figure 3:
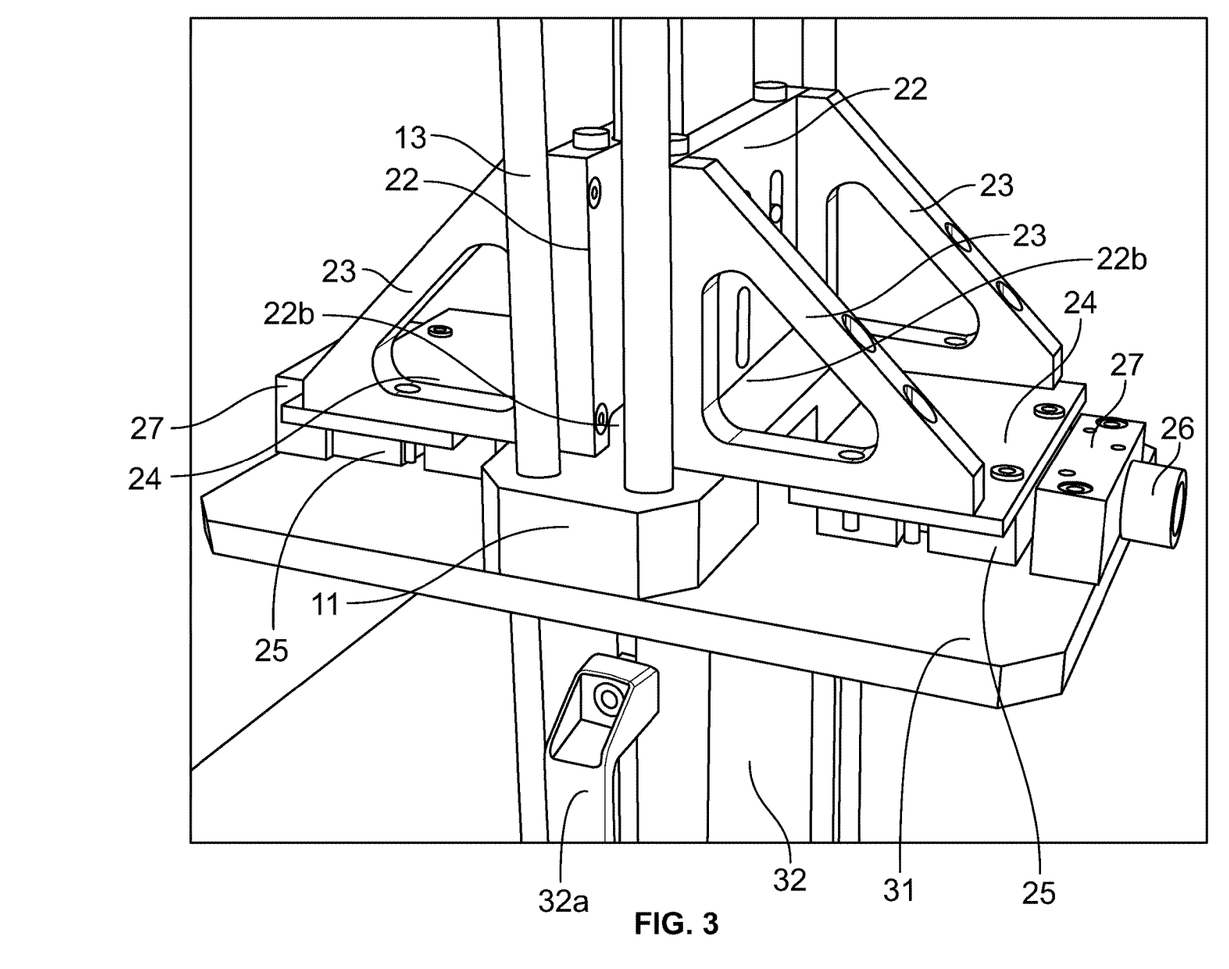
FIG. 3 illustrates support plates of the guide according to FIG. 1.

Referring now to FIG. 3, two support plates 22 are provided between the first and second loading plates 11, 12, and are disposed parallel to the test sample TS. The support plates 22 rest upon the first loading plate 11. Each support plate 22 has a passage 22b along the centre of the bottom edge. Each passage 22b is wider than the test sample TS. The height of each passage 22b is such that, upon gross deformation of the test sample TS during a compression test, a part of the test sample TS may deform through one of or both passages 22b.

Two support members 21 are connected to each support plate 22 via bolts. The bolts are received in elongated slots 22a in the support plate 22 (as best illustrated in FIGS. 1 and 2). The bolts are located in slots 22a to allow the position of the support members 21 to be adjustable in the loading direction. The support members 21 are positioned so as to define a space between the first loading plate 11 and the respective support member 21. The size of the space is adjustable by adjusting the position of the support members 21 along the loading direction. The height of the space may be less than, equal to or greater than the height of the passage 22b. The space means that, upon gross deformation of the test sample TS during a compression test, a part of the test sample TS may deform through one of or both spaces.

Each support plate 22 is supported along the edges which are parallel to the loading direction, by brackets 23. Each bracket 23 has a vertical member which is connected to the respective support plate 22, and a horizontal member which extends in a direction perpendicular to the loading direction and away from the test sample TS.

The guide also comprises two mounting plates 24 disposed on either side of the test sample TS. The horizontal members of two of the brackets 23 are connected to opposing edges of each mounting plate 24, such that the mounting plates 24 are disposed perpendicular to the loading direction.

Each mounting plate 24 is mounted to a sliding block 25. Each sliding block 25 is moveable towards and away from the first loading plate 11. Moving the sliding blocks 25 moves the support members 21 in the direction perpendicular to the test sample TS to accommodate various thickness of test sample TS.

Each sliding block 25 is moved via rotation of a bolt 26. Each bolt 26 is in threaded engagement with the respective sliding block 25 and is axially constrained by a fixed block 27. Accordingly, when each bolt 26 is rotated, the threaded engagement causes the respective sliding block 25 to translate there along.

Figure 4:
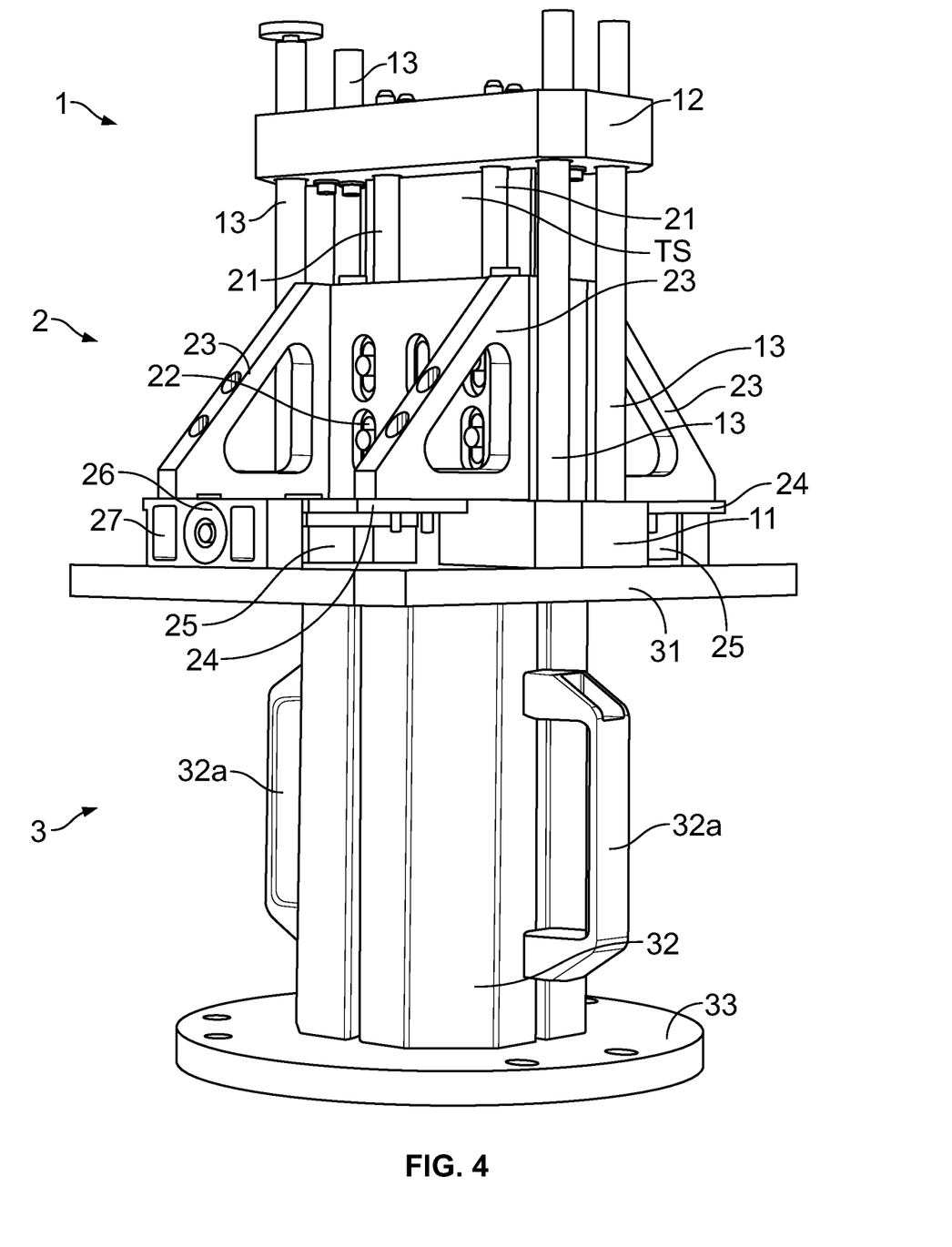
FIG. 4 illustrates the guide of FIG. 1 mounted to a stand.
Figure 5:
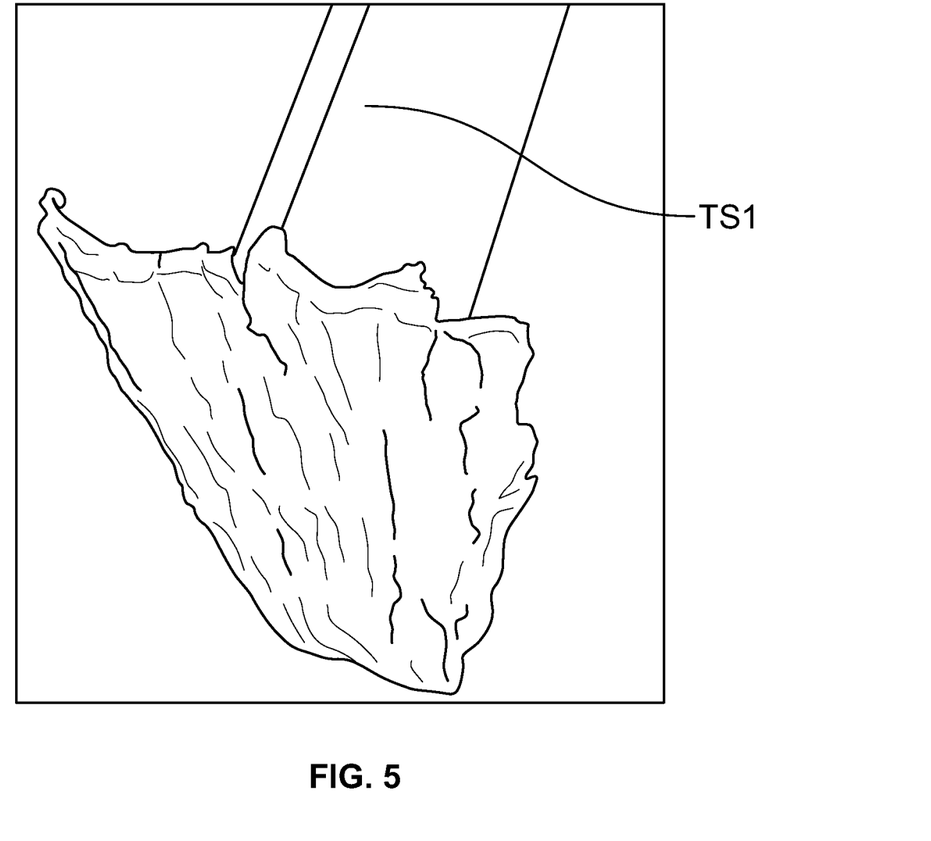
FIG. 5 illustrates a carbon fibre reinforced polymer test sample which has been subjected to a compression test using a guide according to the disclosure.

Referring now to FIG. 4, the test fixture 1 and guide 2 are disposed on a stand 3. The stand comprises a table 31, upon which the first loading plate 11 of the test fixture 1 rests. The fixed block 27 is fixed to the table 31, and the sliding block 25 is slidable along the table 31.

The table 31 is mounted to the top of a pillar 32. The pillar 32 has handles 32a for manoeuvring the stand 3. The pillar 32 is mounted to a base 33 at the bottom. The base 33 rests upon the bottom of a drop tower machine of on the floor. The base 33 has an array of mounting holes for connecting the stand to the bottom of the drop tower machine or to the floor.

In use in a drop tower test, the stand 3 is positioned in a drop tower test machine, the test fixture 1 is disposed upon the table 31, and the fixed block 27 of the guide 2 is connected to the table 31. The test fixture 1 and guide 2 can be disposed onto the table 31, and then the test fixture 1, guide 2 and stand 3 can be positioned in the drop tower test machine simultaneously.

The test sample TS is located between the first and second loading plates 11, 12 and between the support members 21. The bolts 26 on either side of the test sample TS are rotated to move the sliding blocks 25, such that the support members 21 are moved to desired distances from the surfaces of the test sample TS. The slots 12b in the second loading plate 12 allow for the movement of the support members 21 in the direction perpendicular to the loading direction.

In performing a compression test, an impactor of the drop tower test machine impacts the second loading plate 12. This causes the second loading plate to move towards the first loading plate 11 and so to load the test sample in the loading direction. The support members 21 prevent global buckling of the test sample TS during loading.

Referring now to FIG. 5, a glass fibre reinforced polymer (CFRP) test sample TS1, which has been subjected to a drop tower test using a guide of the present disclosure, is illustrated. The laminated material of the test sample TS1 has delaminated at the edge adjacent to the first loading plate 11 to form a splaying failure mode. Upon delamination, the test sample material has deformed, or splayed, in directions perpendicular to the loading direction. This deformed material has been able to pass, substantially uninhibited, through the space between the first loading plate 11 and the support member 21, and through the passage 22b.

By not inhibiting the passing of test sample material through the space between the first loading plate 11 and the support member 21 and through the passage 22b, no energy has been dissipated due to localise damage of the test sample TS1 around the support members 21. Therefore, the crashworthiness of the test sample TS1 is determinable.

Furthermore, the provision of support members 21 extending across the unsupported section of the test sample TS, TS1 allows for the testing of large samples such that results are not affected by localised material characteristics.

The provision of the space between the first loading plate 11 and the support member 21 and through the passage 22b, makes the guide particularly beneficial for the crashworthiness testing of FRP test samples (for example CFRP) for use in automotive or aerospace applications. In these applications the crashworthiness, which is the ability of a structure to protect the occupants in survivable crashes, is linked to the edgewise compressive strength of the FRP material. Therefore, by allowing the test sample TS, TS1 to splay substantially freely, the crashworthiness is more accurately predictable.

Furthermore, the test samples TS, TS1 are 150 mm tall and 100 mm wide, which is sufficiently large to improve predictions of crashworthiness by reducing localised effects in the FRP materials.

Although in the embodiment shown in the figures four support members 21 are shown, any number of support members are envisaged. For example, a third support member might be connected to the centre of each support plate 22.

Referring now to FIGS. 6 to 10, an alternative example embodiment of the test fixture (or guide) 100 of the present disclosure is illustrated for use in a drop tower, for edgewise compression testing a flat, planar test sample TS. In this alternative embodiment the dimensions of the test sample TS may be the same or similar to the test sample described in the previous embodiment, but it is appreciated that any size of test sample may be used, and the test sample TS is not limited to a flat, planar test sample TS as illustrated.

The test fixture 100 comprises a first or bottom loading plate or platen 111 and a test sample TS is located in an edgewise configuration, between the first loading plate 111 and an upper impactor contact side 114. During testing, an impactor 200 (see FIG. 8) moves towards the first loading plate 111 to apply a compressive load to the test sample TS. The impactor 200 if provided by a drop tower machine directly impacting the top of the test sample TS. Other machines, such as quasi-static or high-speed compression machines may be used instead.

Figure 6:
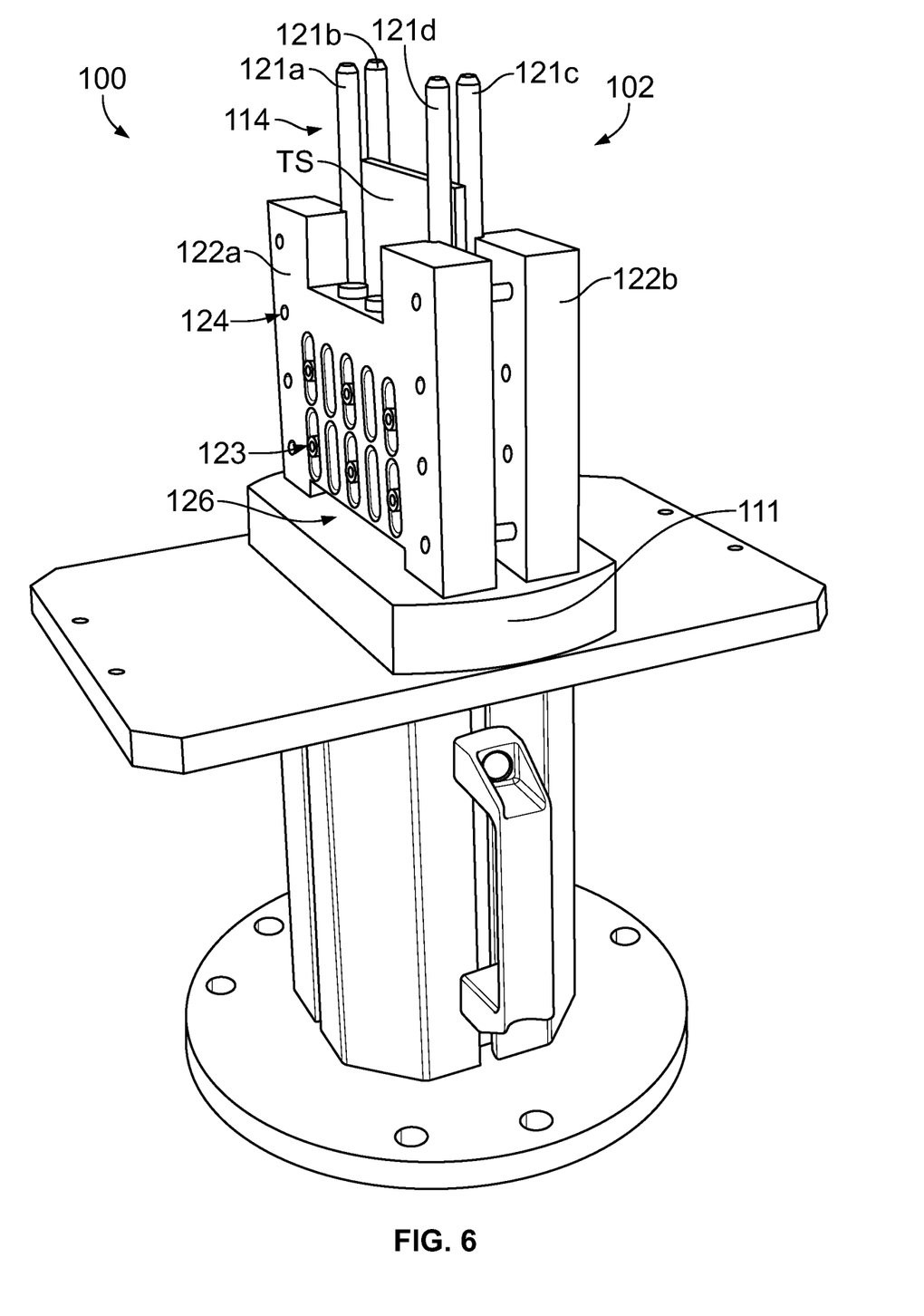
FIG. 6 illustrates an alternative embodiment of the guide according to the disclosure, i.e. without a second loading plate.

Similar to the previous embodiment of the test fixture 1, cooperating support plates 122a and 122b are provided on either side of the test sample TS. The support plates 122a, 122b are operably coupled to the first loading plate 111 and are configured to move relative to the first loading plate 111 in a direction perpendicular to a loading plane, i.e. a plane defined by the loading direction and the principle surface plane of the test sample TS. The cooperating support plates 122a, 122b are configured to operably engage with each other so as to provide a clamping force onto the test sample TS. The clamping force acting on the test sample TS may be provided by a plurality of screw fasteners 124, but any other suitable means may be used. The clamping force acting on the test sample may be controlled using a dynamometric wrench acting on the plurality of screw fasteners 124. However, it is understood by the person skilled in the art, that any suitable fastening/clamping means may be used to clamp the test sample TS between respective support plates 122a, 122b. For example, suitable pressure sensors (pressure plates) may be used to determine the force pressing on the test sample TS during use.

Each support plate 122a, b has a passage 126a, b along the centre of the bottom edge. Each passage 126a, b is wider than the test sample TS. The height of each passage 126a, b is such that, upon gross deformation of the test sample TS during a compression test, a part of the test sample TS may deform through one of or both passages 126a, b.

Figure 7A:
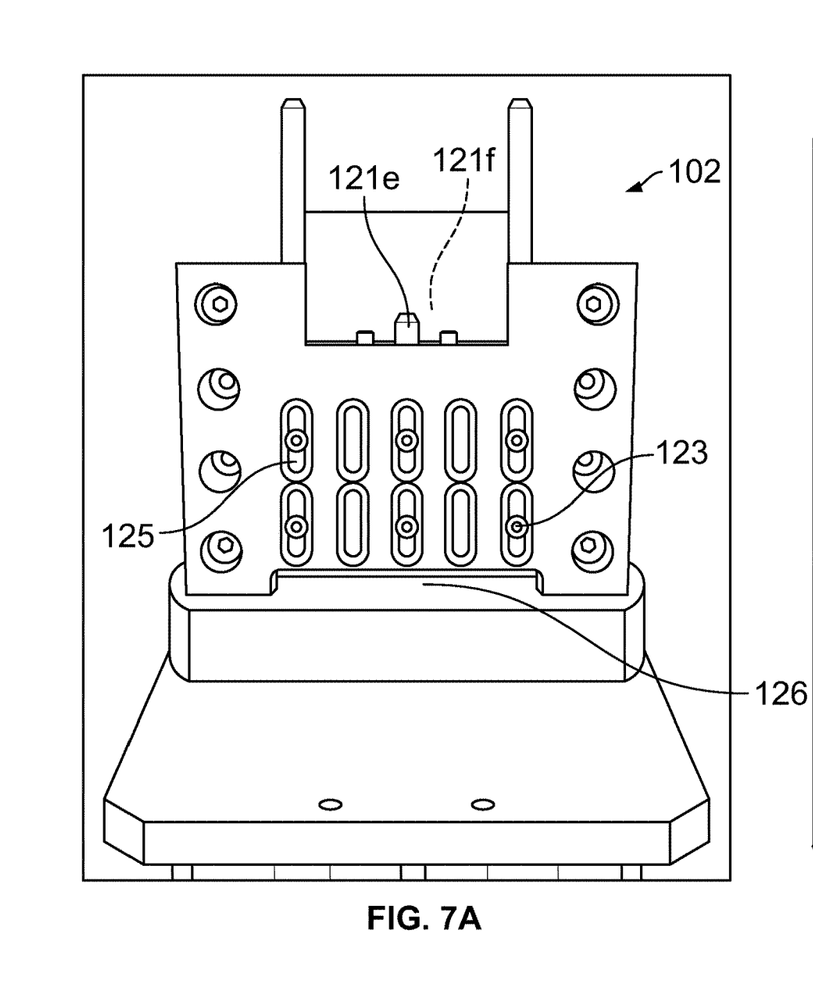
Figure 7B:
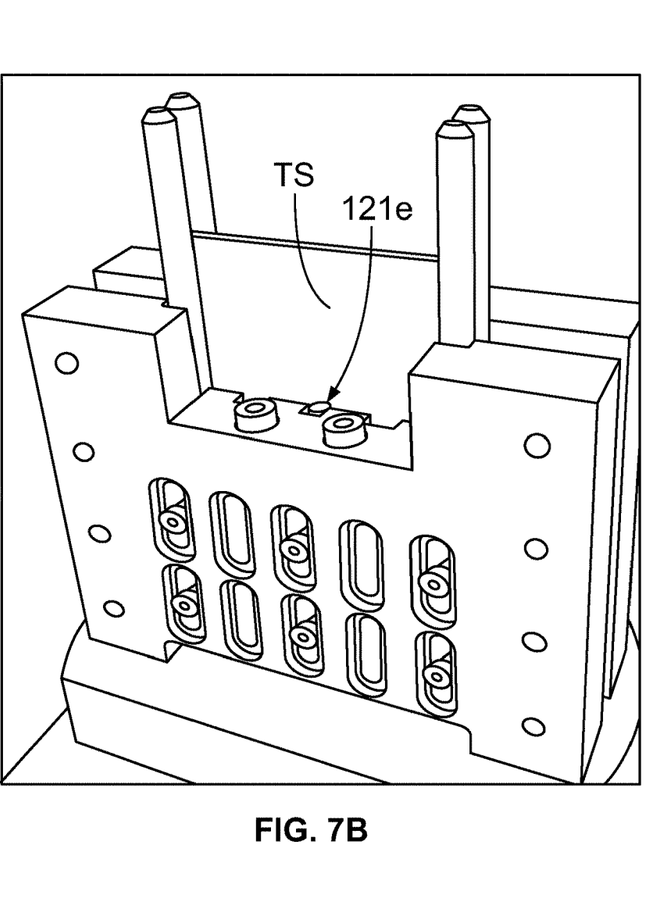

As described in the previous embodiment, a guide 102 is positioned between respective support plates 122a, 122b to inhibit global buckling of the test sample TS during compression testing. In the example embodiment, the guide 102 comprises four support members 121a-d. As with the previous example, the support members 121a-d are circular rods, but other configurations are envisaged, such as knife edges. Two support members 121a, d and 121b,c are each located on opposing sides of the test sample TS, orientated to be parallel with the loading direction. The proximity of the support members 121a-d to the surfaces of the test sample TS is dependent upon the test configuration. The support members 121a-d may be spaced apart from or in contact with the test sample TS. Additional central support members 121e, f (see FIG. 7(a)) may be provided in line with the other "corner" support members 121a-d The support members 121a-f are received in suitable apertures of respective support plates 122a, 122b and connected to the support plates 122a, b via bolts 123. The bolts 123 are received in elongated slots 125 in the support plate 122a, b (as best illustrated in FIGS. 7a, b). The bolts 123 are located in slots 125 so as to allow the position of the support members 121a-f to be adjustable in the loading direction. The support members 121a-f are positioned so as to define a space between the first loading plate 111 and the respective support member 121a-f. The size of the space is adjustable by adjusting the position of the support members 121a-f along the loading direction. The height of the space may be less than, equal to or greater than the height of a passage 126a, b formed at the bottom end of the support plates 122a, b. The space means that, upon gross deformation of the test sample TS during a compression test, a part of the test sample TS may deform through one of or both spaces and the passage 126.

As illustrated in FIG. 7(a), the centrally located support members 121e and 121f are shorter in length than the "corner" support members 121a-c, i.e. only extending into an upper region of the test sample TS, the length of which can be regulated by loosening the bolts 123 and sliding the support member 121e, f up or down. The position of the support members 121a-f can be optimised to avoid or at least minimise buckling of the test sample TS during testing.

Figure 8A:
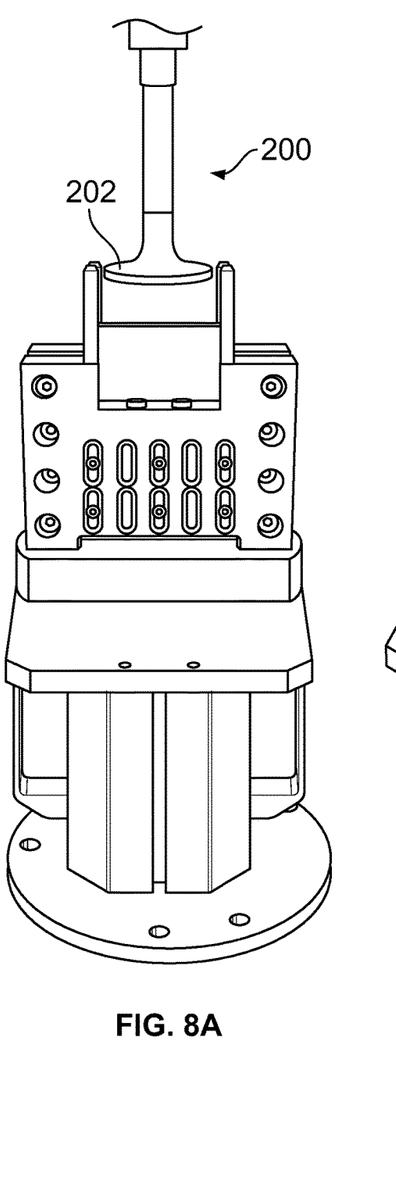
Figure 8B:
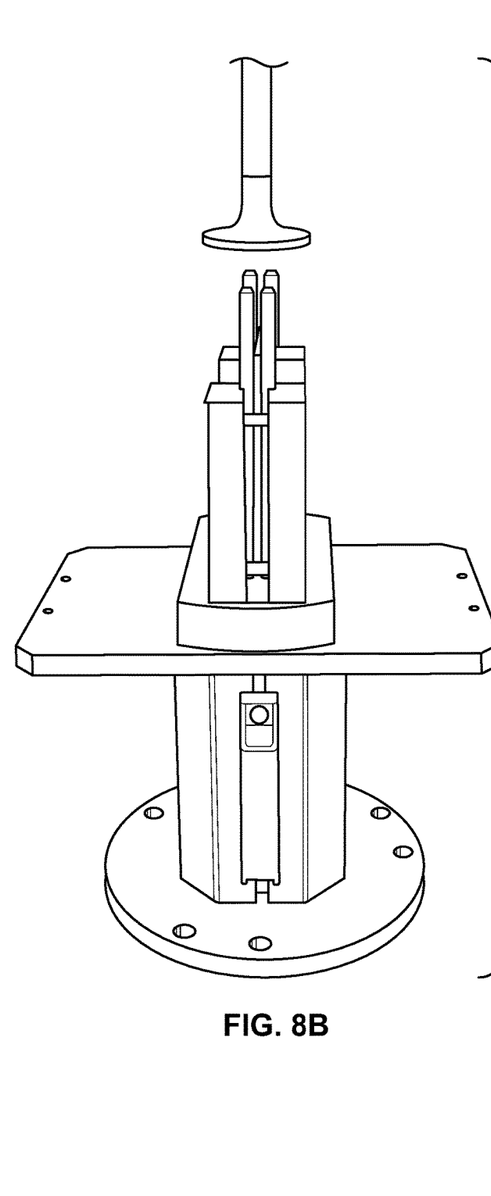
Figure 8C:
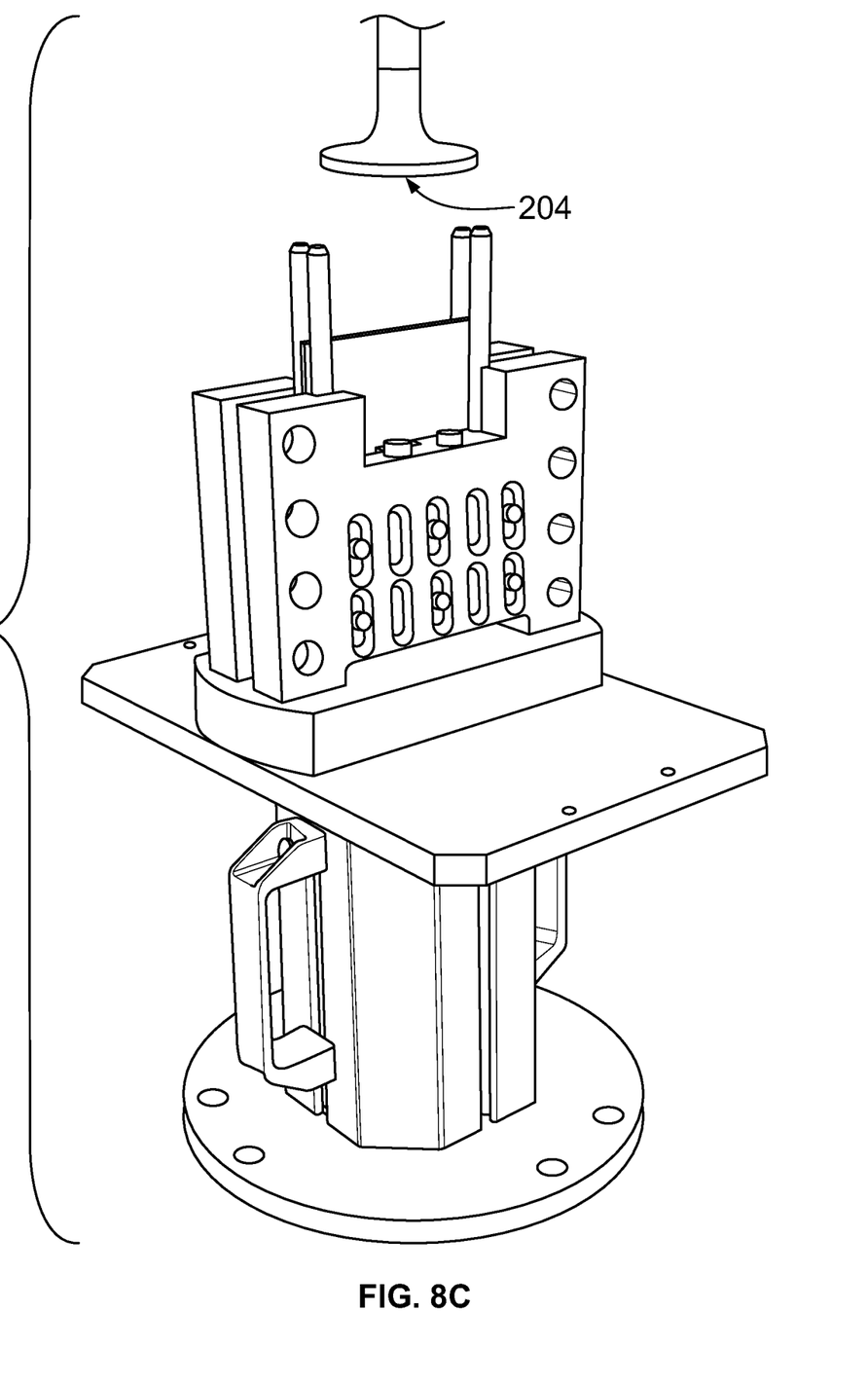

FIG. 8(a)-(c) shows the test fixture 100 in use with an impactor 200 moving towards and into contact engagement with the test sample TS.

Figure 9A:
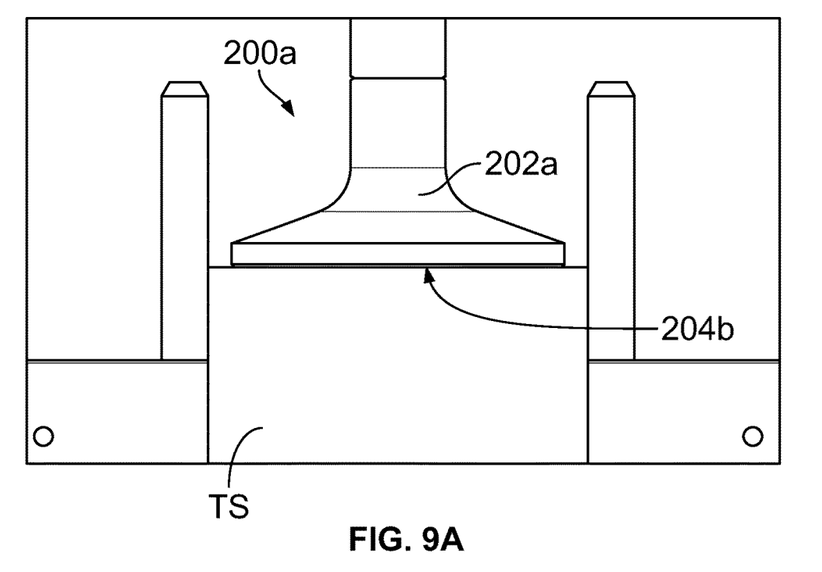
Figure 9B:
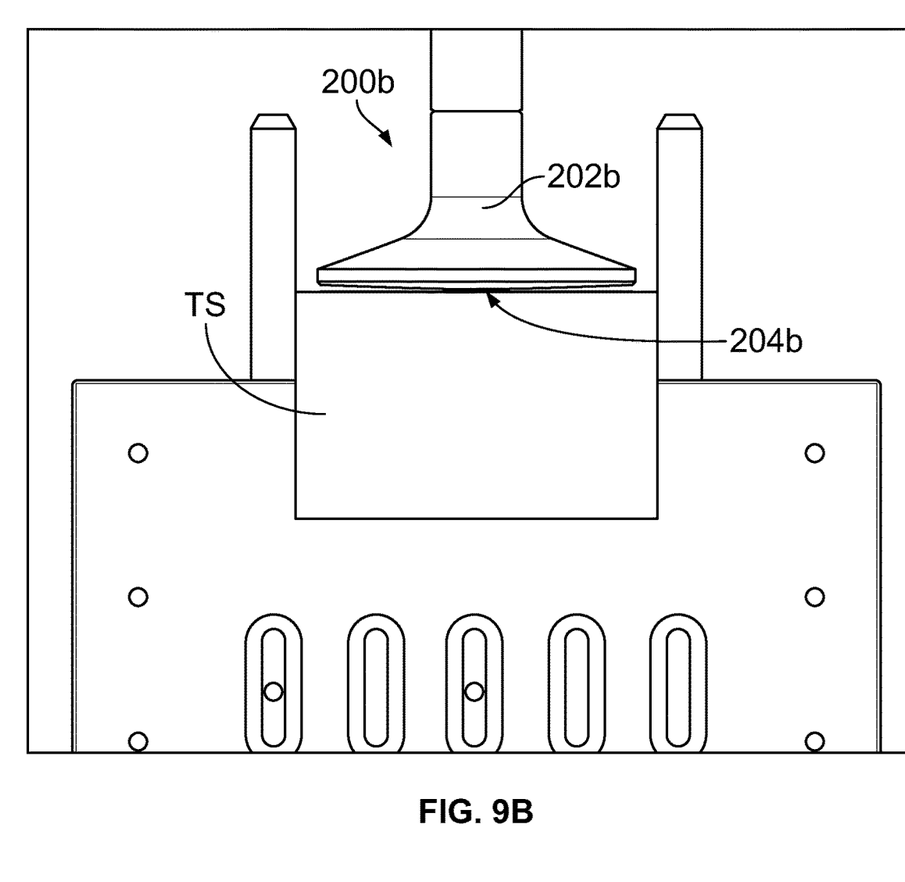

As illustrated in FIGS. 9(a) and (b), a head portion 202a,b of the impactor 200a,b may have a differently shaped contact surfaces 204a,b. Contact surface 204a of impactor 200a is flat equally applying load onto the flat test sample surface upon engagement of the impactor 200. However, an improved or optimised contact surface 204b is shown in FIG. 9(b), where the header portion 202b has a substantially spherical contact surface 204b, allowing gradual release of the loading energy on the test sample TS during engagement with the impactor 200, thus, concentrating the load and avoiding the so called "scissor effect".

It will be appreciated by persons skilled in the art that the above embodiment(s) have been described by way of example only and not in any limitative sense, and that various alterations and modifications are possible without departing from the scope of the disclosure as defined by the appended claims. Various modifications to the detailed designs as described above are possible.

The invention claimed is:

1. A guide for use in a compression test apparatus having a test sample between a first loading plate and an opposing load applied towards the test sample and the first loading plate in a loading direction, the guide comprising:
   at least one support member, having at least a portion positionable between the first loading plate and the load and extending substantially parallel to the loading direction to constrain the test sample in a direction perpendicular to the loading direction,
   wherein, when in use, the at least one support member is positioned to define a space between the first loading plate and the support member such that when a load is applied the test sample is deformable in a direction perpendicular to the loading direction within the space,
   wherein the guide further comprises a support plate on each side of the test sample, wherein each support plate has at least one support member operably connected to the support plate; and
   wherein each support member is selectively moveably connected to the respective support plate, so as to allow sliding movement in the loading direction of any of the at least one support member relative to the respective support plate.

2. The guide according to claim 1, wherein the load applied to the test sample is provided by an impactor member.

3. The guide according to claim 2, wherein the first loading plate is a lower loading plate relative to the impactor member when applying the load to the test sample, during use.

4. The guide according to claim 2, wherein the impactor member comprises a substantially planar-shaped impactor head portion having a contact surface configured to engage with the test sample.

5. The guide according to claim 4, wherein the impactor member comprises a substantially spherically shaped impactor head portion having a contact surface configured to engage with the test sample.

6. The guide according to claim 5, wherein the contact surface has a predetermined radius adapted to provide an optimised gradual distribution of load energy into the test sample, during use.

7. The guide according to claim 1, wherein at least one support member is disposed on each side of the test sample.

8. The guide according to claim 1, wherein each one of the at least one support member comprises a Polytetrafluoroethylene (PTFE) coating adapted to minimize friction between the test sample and each one of the at least one support member, during use.

9. The guide according to claim 1, wherein the support plate on one side of the test sample is configured to cooperatively engage with the support plate on the other side of the test sample so as to provide a predetermined clamping force on the test sample.

* * * * *